United States Patent [19]
Ohsawa

[11] Patent Number: 5,393,969
[45] Date of Patent: Feb. 28, 1995

[54] DEVICE FOR DETECTING FOCUS AT DIFFERENT AREAS OF AN IMAGE FIELD

[75] Inventor: Keiji Ohsawa, Tokyo, Japan

[73] Assignee: Nikon Corporation, Tokyo, Japan

[21] Appl. No.: 266,315

[22] Filed: Jun. 27, 1994

Related U.S. Application Data

[63] Continuation of Ser. No. 5,144, Jan. 15, 1993, abandoned.

[30] Foreign Application Priority Data

Jan. 22, 1992 [JP] Japan .................. 4-031600
Nov. 13, 1992 [JP] Japan .................. 4-328656

[51] Int. Cl.6 .................................. G01J 1/20
[52] U.S. Cl. .......................... 250/201.8; 354/407
[58] Field of Search .................. 250/201.8, 204;
354/408, 406, 407, 402

[56] References Cited

U.S. PATENT DOCUMENTS

| | | | |
|---|---|---|---|
| 4,387,975 | 6/1983 | Araki | 250/201.8 |
| 4,562,345 | 12/1985 | Aoki | 250/201.8 |
| 4,878,079 | 10/1989 | Hamada et al. | 354/402 |

FOREIGN PATENT DOCUMENTS

| | | | |
|---|---|---|---|
| 5854323 | 3/1983 | Japan | 354/408 |
| 2-120712 | 5/1990 | Japan . | |

*Primary Examiner*—David C. Nelms
*Assistant Examiner*—Stephone B. Allen
*Attorney, Agent, or Firm*—Shapiro and Shapiro

[57] ABSTRACT

A focus state detecting device of divided-pupil phase difference system, having plural distance measuring areas, in which photosensors are provided respectively corresponding to the distance measuring areas in the image field in order to effect focus state detection in the plural distance measuring areas, and at least a part of the photosensors are constructed as an independent unit separate from others, whereby optical adjustment is rendered possible independently in each distance measuring area.

33 Claims, 10 Drawing Sheets

DEVICE FOR DETECTING FOCUS AT DIFFERENT AREAS OF AN IMAGE FIELD

This is a continuation of application Ser. No. 08/005,144, filed Jan. 15, 1993, now abandoned.

BACKGROUND OF THE INVENTION

1. Field of the Invention

The present invention relates to a focus state detecting device of divided-pupil phase difference method, adapted for use in a camera or the like, and more particularly to a technology, in a focus state detecting device capable of distance measurement in plural distance measuring areas in an image field, for enabling independent optical adjustment in each distance measuring area thereby enabling precise distance measurement in all the distance measuring areas.

2. Related Background Art

Figure 8:
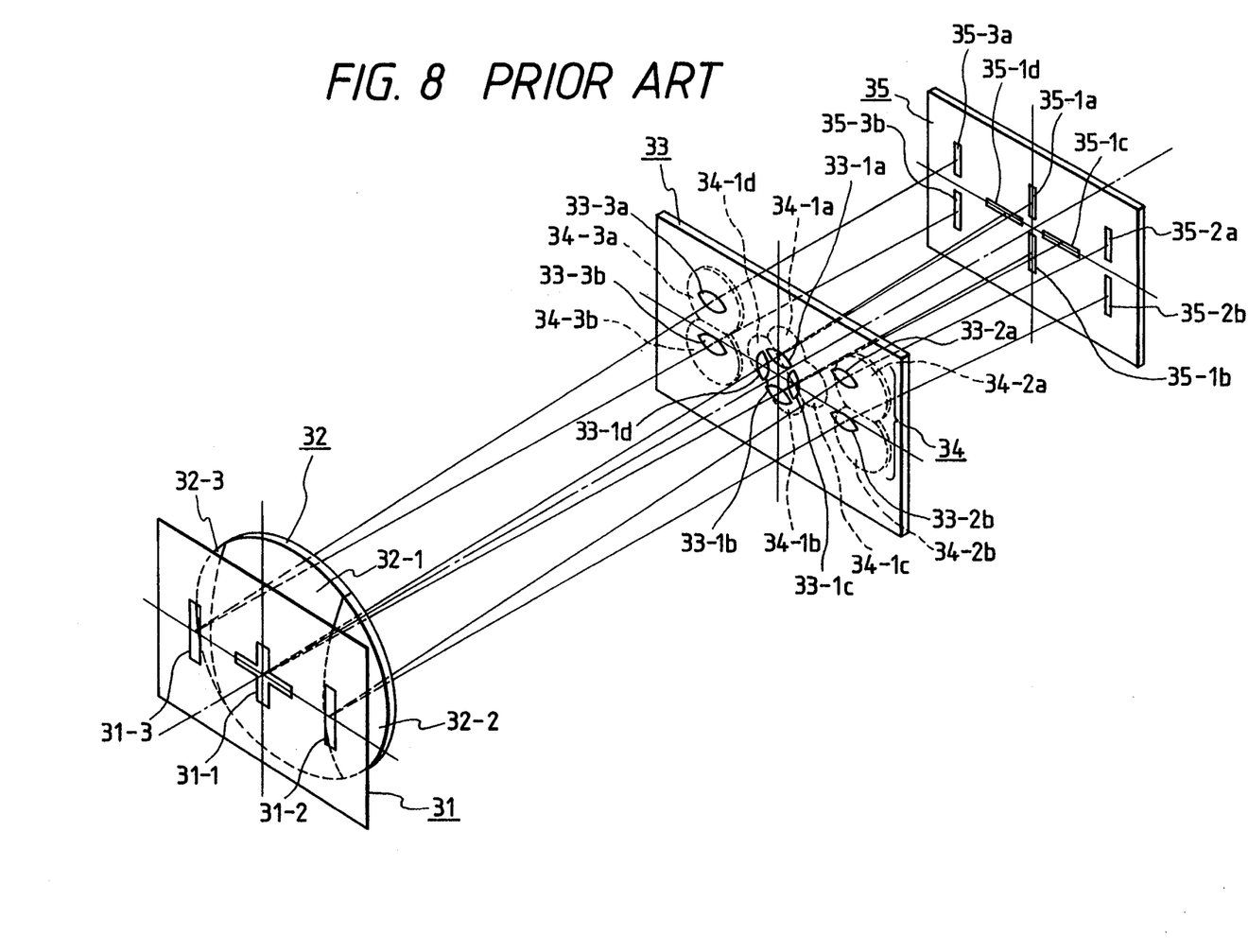
FIG. 8 is a schematic perspective view showing the structure of a conventional focus state detecting device.

The focus state detecting device of divided-pupil phase difference system, adapted for use in a camera or the like, is disclosed for example in the Japanese Patent Laid-open Application No. 2-120712. FIG. 8 schematically shows the principal part of the focus state detecting device described in said patent application. Said device is provided, as shown in FIG. 8, with a field mask 31 having a cross-shaped aperture 31-1 at the approximate center of the image field of an unrepresented objective lens and vertically oblong apertures 31-2, 31-3 formed in the lateral areas, a field lens 32, a diaphragm 33, a secondary optical system 34 having four pairs of secondary imaging lenses, and a photosensor 35 having four pairs of sensor arrays.

The device shown in FIG. 8 is so designed as to be capable of distance measurements in three areas in the image field, and, in the central area, the components are provided in so-called cross type arrangement in which the mutual movement of the light amount distributions of two object images on the sensor plane takes place in the vertical and lateral directions. Such arrangement enables distance measurement in the central and lateral areas of the image field, and, particularly in the central area, it allows satisfactory focus state detection even for an object showing change in the light amount distribution only in the horizontal or vertical direction, by means of the cross-shaped sensors 35-1a, 35-1b, 35-1c and 35-1d.

However, in such focus state detecting devices of divided-pupil phase difference system, including those having plural distance measuring areas as explained above, critical is the relative positional precision between the line, connecting the field mask positioned in the vicinity of the primary image plane and the peak point of face of the corresponding re-imaging lens, and the light-receiving area of the photosensor. For example, in a device having a cross-shaped distance measuring area at the center as shown in FIG. 8, the field mask is shaped as a cross as indicated by 31-1, and the light beam transmitted by such cross-shaped aperture is further transmitted by the field lens 32, then defined by the aperture of the diaphragm 33 and focused by the re-imaging lens 34 onto the sensor plane.

Figure 9:
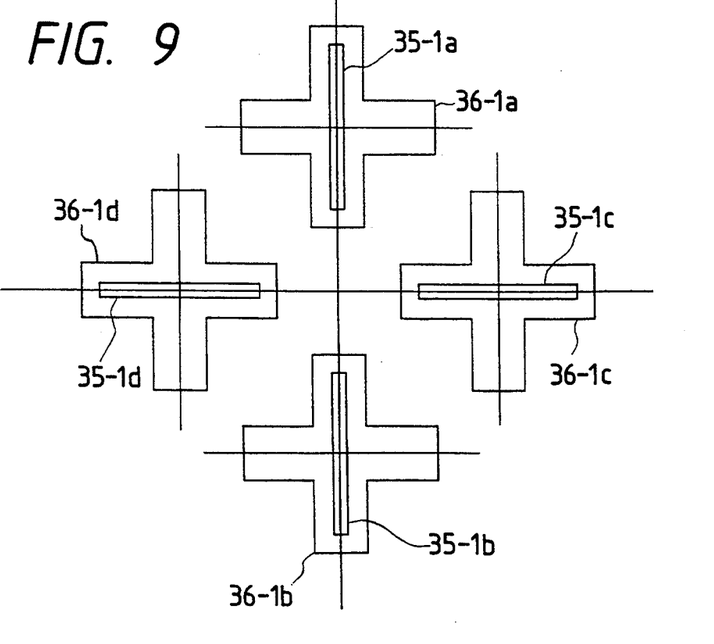
FIGS. 9 to 12 are views showing the positional relationship between the photosensor and the images of the field mask formed by re-imaging lenses.

FIG. 9 shows the mode of imaging on the sensor plane, wherein reference numbers 35-1a, 35-1b, 35-1c and 35-1d indicate the light-receiving arrays of the photosensor 35, as in FIG. 8, while reference numbers 36-1a, 36-1b, 36-1c and 36-1d indicate image areas of the central aperture 31-1 of the field mask 31. FIG. 9 shows a state in which the field mask 31, the re-imaging lens 34 and the light-receiving arrays of the photosensor 35 are mutually adjusted in an ideal state.

Figure 10:
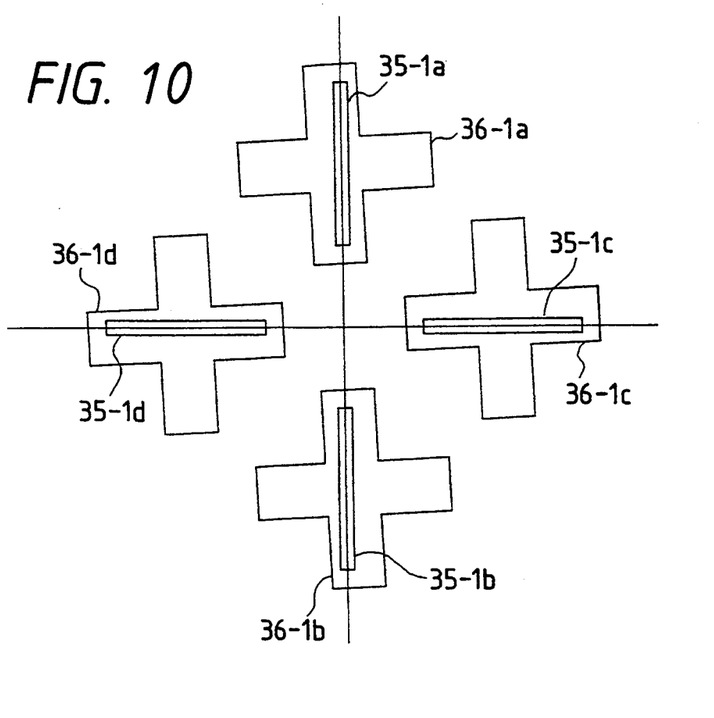

However, for example if the centers of the field mask 31, re-imaging lens 34 and photosensor 35 are mutually aligned but the photosensor 35 alone is angularly displaced in a plane perpendicular to the optical axis, the images of the field mask 31 formed by the re-imaging lens 34 and the sensor arrays of the photosensor 35 are mutually positioned as shown in FIG. 10, wherein proper focus state detection is not possible because the horizontally paired arrays 35-1c, 35-1d or the vertically paired arrays 35-1a, 35-1b used for focus state detection respectively receive different parts of the image of the field mask. In such case, the photosensor 35 has to be adjusted, by rotation, to the positional relationship shown in FIG. 9.

Figure 11:
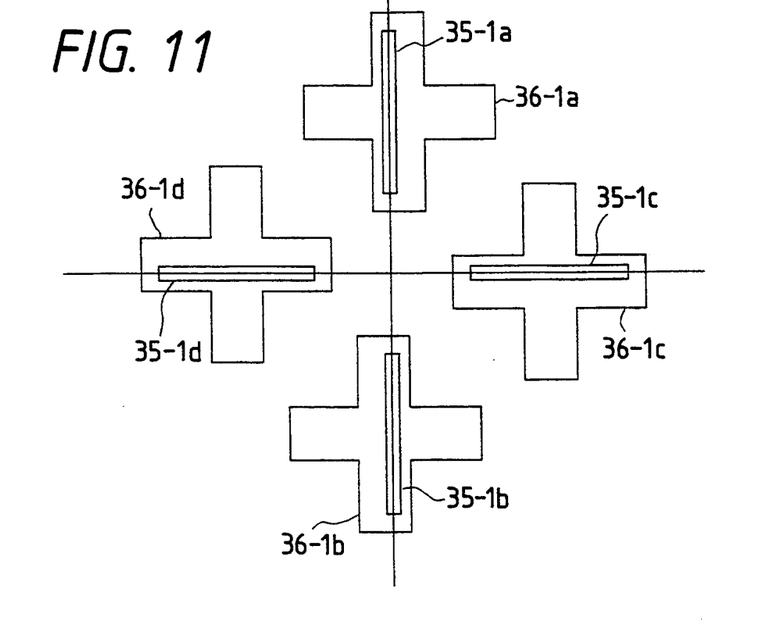
Figure 12:
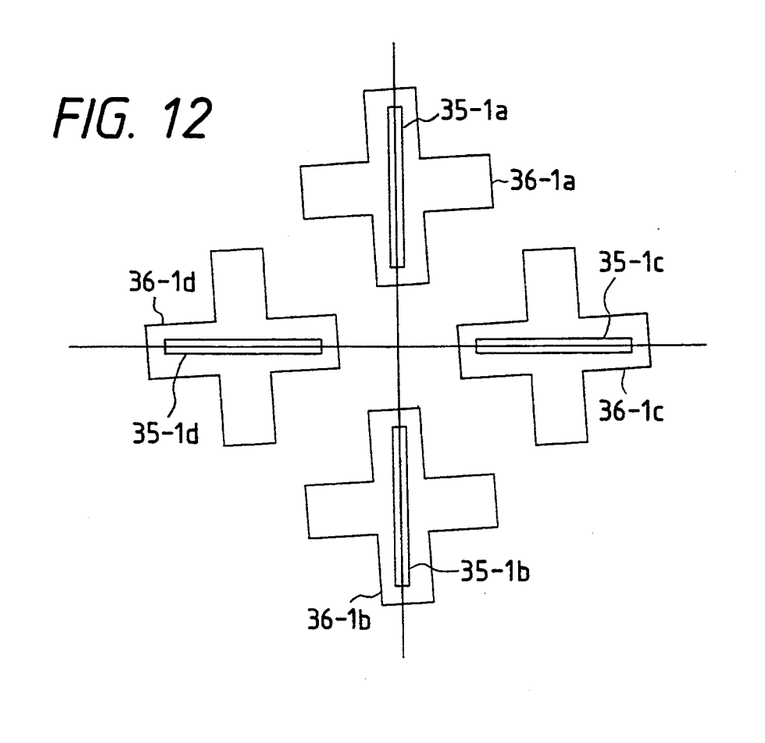

Also if the field mask 31 and the photosensor 35 are mutually aligned but the re-imaging lens 34 is angularly displaced, the images of the aperture 31-1 of the field mask 31 appear as shown in FIG. 11, and, also in this case, the paired sensor arrays respectively receive different parts of the image. It is therefore necessary to adjust, by rotation, the photosensor 35 to the state shown in FIG. 12, whereby the paired sensor arrays receive the same parts of the image.

Thus, if only one distance measuring area is provided in the image field, there can be executed the rotational adjustment of the photosensor in the situation shown in FIG. 10 or 11, regardless of whether the aperture of the field mask is cross-shaped or not. However, if three distance-measuring areas are provided in the image field, and the re-imaging lens and the photosensor are integrally constructed in three optical systems corresponding to said distance-measuring areas, as in the device disclosed in the Japanese Patent Laid-open Application No. 2-120712 and shown in FIG. 8, the above-mentioned rotation of the photosensor can achieve adjustment in one of three distance-measuring areas but not in the other two areas, because the photosensor can no longer be moved further. In the conventional focus state detecting device with plural distance-measuring areas, therefore, it has been impossible to effect optimum optical adjustment for all the distance-measuring areas, and, for this reason, to achieve distance measurement of high precision in each of the plural distance-measuring areas.

SUMMARY OF THE INVENTION

In consideration of the foregoing, an object of the present invention is, in the focus state detecting device of divided-pupil phase difference system with plural distance measuring areas, to enable optimum adjustment in each of the distance measuring areas, thereby allowing precise focus state detection in the plural distance measuring areas.

The above-mentioned object can be attained, according to the present invention, by a focus state detecting device for forming plural light amount distributions relative to the object image, utilizing light beams transmitted by different areas of the pupil of an objective lens, by means of optical means including a re-imaging lens positioned at the image plane side of said objective lens, then determining the relative positional relationship of said plural light amount distributions by means of photosensor means, and determining the focus state of said objective lens utilizing the signal from said photosensor means, said focus state detecting device comprising said photosensor means respectively corresponding to plural detection areas in the image field in order to effect focus state detection in said plural detection areas, wherein at least a part of said photosensor means is constructed as a unit independent from other photosensor means.

Also among the paths of the light beams coming from different areas of the pupil of said objective lens and leading to respectively corresponding photosensor means, at least one may be deflected in a direction different from those of other light paths.

In the above-mentioned configuration, each of the distance measuring areas of the focus state detecting device can be independently adjusted in optically optimum state, since at least a part of plural photosensor means is constructed as a unit independent from others. Thus optimum focus state detection is rendered possible in each of the plural detection areas. Also owing to the fact that at least a part of the photosensor means corresponding to the plural detection areas is constructed as a unit independent from others, there can be designed, for example, an optical system independent for each detection area, and, among the paths of the light beams coming from different areas of the pupil of the objective lens and leading to the respectively corresponding photosensor means, at least one may be deflected, for example by a mirror or a prism, in a direction different from those of other paths. It is therefore rendered possible to select the optical path length from the objective lens to the photosensor means or the performance of the re-imaging lens provided in said optical path, independently for each detection area, and there can be achieved optimum designing in consideration of the space utilization, such as the positioning of the photosensor means constructed as the independent unit.

DETAILED DESCRIPTION OF THE PREFERRED EMBODIMENTS

Figure 1:
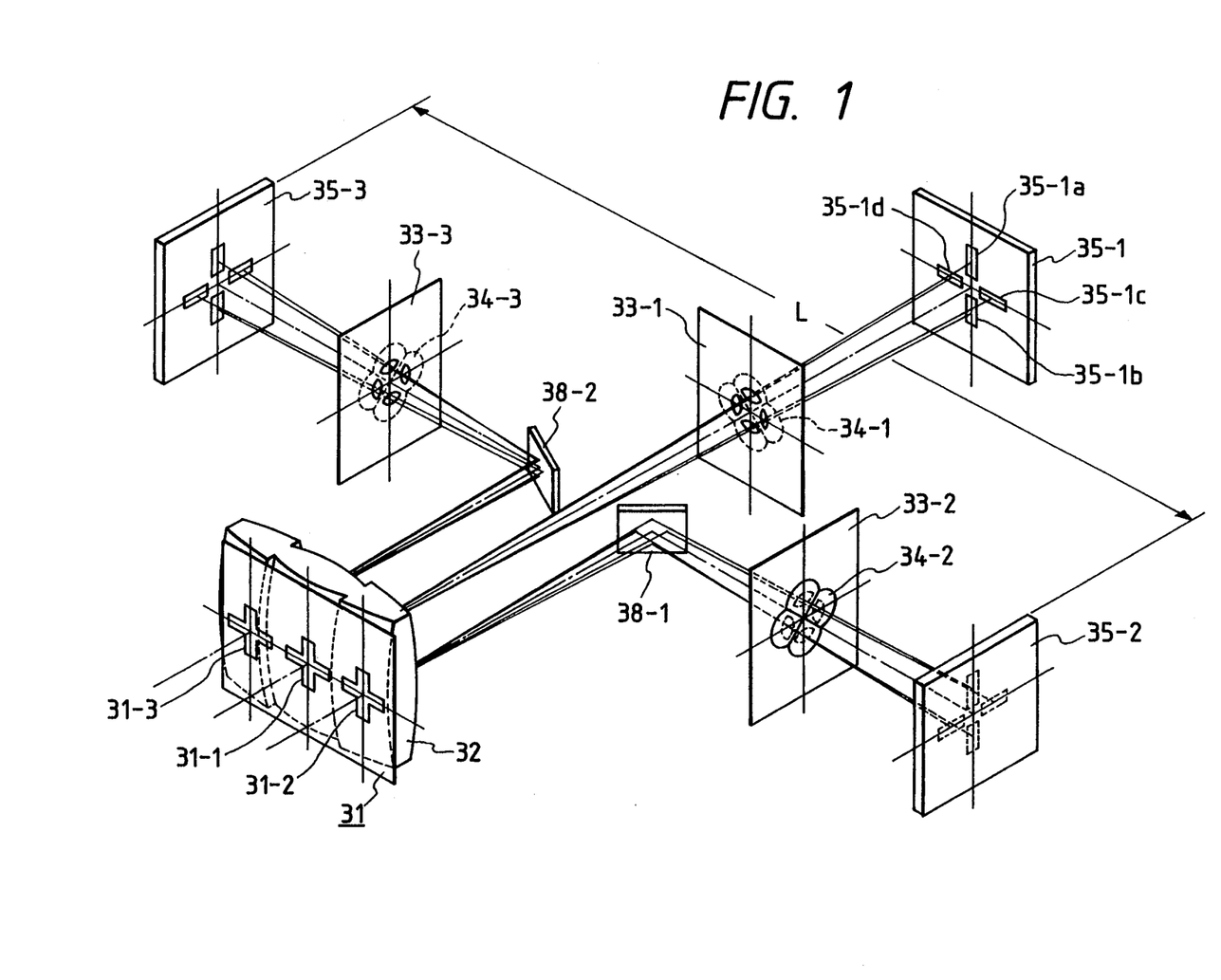
FIG. 1 is a schematic perspective view of the principal part of a focus state detecting device, constituting an embodiment of the present invention.

Now the present invention will be clarified in detail by embodiments thereof shown in the attached drawings. FIG. 1 schematically illustrates the principal part of the optical system of a focus state detecting device, constituting a first embodiment of the present invention, wherein the components correspondingly numbered as in FIG. 1 have substantially the same functions, and include a field mask 31, a field lens 32, diaphragms 33-1, 33-2, 33-3, re-imaging lenses 34-1, 34-2, 34-3, photosensors 35-1, 35-2, 35-3, etc. In the present embodiment, however, three apertures 31-1, 31-2, 31-3 provided at the approximate center and at the lateral parts of the field mask 31 are all cross-shaped, for achieving cross-type focus state detection.

Consequently the re-imaging lenses 34 and the sensor arrays of the photosensor 35 are provided in six pairs in total. More specifically, corresponding to the central aperture 31-1 of the field mask 31 there are provided two pairs of re-imaging lenses 34-1 and two pairs of sensor arrays 35-1a, 35-1b, 35-1c, 35-1d. Also corresponding to the aperture 31-2 of the field mask 31, there are provided two pairs of re-imaging lenses 34-2 and a photosensor 35-2 provided with two pairs of sensor arrays, and, corresponding to an aperture 31-3 there are provided two pairs of re-imaging lenses 34-3 and a photosensor 35-3 provided with two pairs of sensor arrays. The optical paths for the distance measuring areas at right and at left are substantially perpendicularly deflected, in mutually opposite directions with respect to the central optical path, by means of mirrors 38-1, 38-2 positioned between the field lens 32 and the diaphragm members 33 positioned in front of the re-imaging lenses 34, so that the re-imaging lenses 34-2, 34-3 and the photosensors 35-2, 35-3 are positioned in mutually opposite manner, across the central optical path. For obtaining such configuration, the re-imaging lenses 34-1, 34-2, 34-3 are constructed as independent units, in contrast to the structure shown in FIG. 8. Also the photosensors 35-1, 35-2, 35-3 are likewise constructed as independent units.

Consequently, in such focus state detecting device capable of distance measurement in three areas, the optical systems from the field lens 32 to the photosensors 35-1, 35-2, 35-3 are rendered mutually independent, and the photosensors 35-1, 35-2, 35-3 are contained in separate packages whereby the aforementioned positional adjustment of the photosensors can be independently effected for each distance measuring area, in optimum manner. Also the arrangement of the re-imaging lens and the photosensor can be selected for each optical path. Therefore, if the width L of the focus state detecting device is to be minimized for the purpose of space saving, the optical path length from the field lens 32 to the photosensor 35 may be selected shorter in the lateral optical paths to the photosensors 35-2, 35-3 than in the central optical path.

FIGS. 2 to 6 illustrate other embodiments of the focus state detecting device of the present invention, applied to a single-lens reflex camera. In these drawings, the focus state detecting light beams, coming from an unrepresented phototaking lens, are transmitted by a half-transparent portion of a quick-return mirror 21 and are guided by a sub mirror 22 to the focus state detecting device. In said device, components the same as or equivalent to those in FIG. 1 are represented by same reference numbers. The focus state detecting device is further provided with a mirror 37 for deflecting the detecting light beam, introduced by the sub mirror 22 and transmitted by the field lens 32, toward the front (toward the phototaking lens) thereby limiting the space required below.

Among the light beams deflected by the mirror 37, the central one is transmitted by the diaphragm 33-1 and the re-imaging lens 34-1 to the photosensor 35-1 without deflection, but the outer light beams are respectively deflected by the mirrors 38-1, 38-2. In the embodiment shown in FIG. 2, the lateral light beams are laterally deflected toward the photosensors 35-2, 35-3. Also in the embodiments shown in FIGS. 3 and 4, said lateral light beams are respectively deflected upwards or downwards, to the photosensors 35-2, 35-3. In these embodiments, the photosensors 35-1, 35-2, 35-3 are contained, as independent units, in unrepresented packages.

Figure 6:
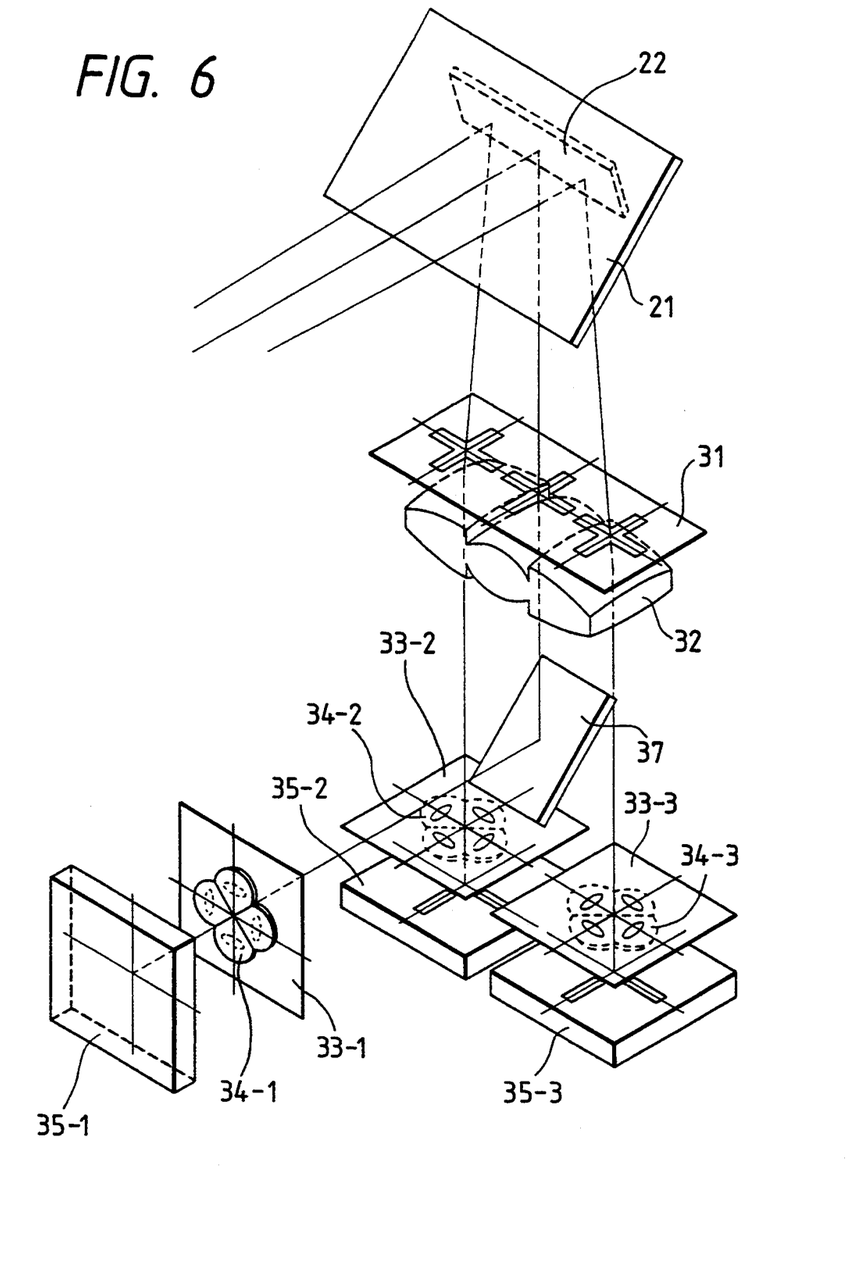
FIG. 6 is a schematic perspective view of still another embodiment of the focus state detecting device.

FIG. 6 shows still another embodiment of the focus state detecting device. The central light beam is deflected by the mirror 37, then transmitted by the diaphragm 33-1 and the re-imaging lens 34-1 and guided to the photosensor 35-1 as in the foregoing embodiments, but said mirror 37 only has a width corresponding to that of the central light beam, so that the lateral light beams are guided, after being transmitted by the field lens 32, to the corresponding photosensors 35-2, 35-3 without deflection. Also in this embodiment, the photosensors 35-1, 35-2, 35-3 are constructed as independent units. This configuration allows simplifying the optical system, dispensing with the mirrors 38-1, 38-2 shown in FIGS. 2, 3, 4 for guiding the lateral light beams to the photosensors 35-2, 35-3. Also the photosensors can be divided into two groups, namely the central one 35-1 and the lateral ones 35-2, 35-3, and placed in mutually separate positions, so that the device can be made compact through effective space utilization.

Figure 5:
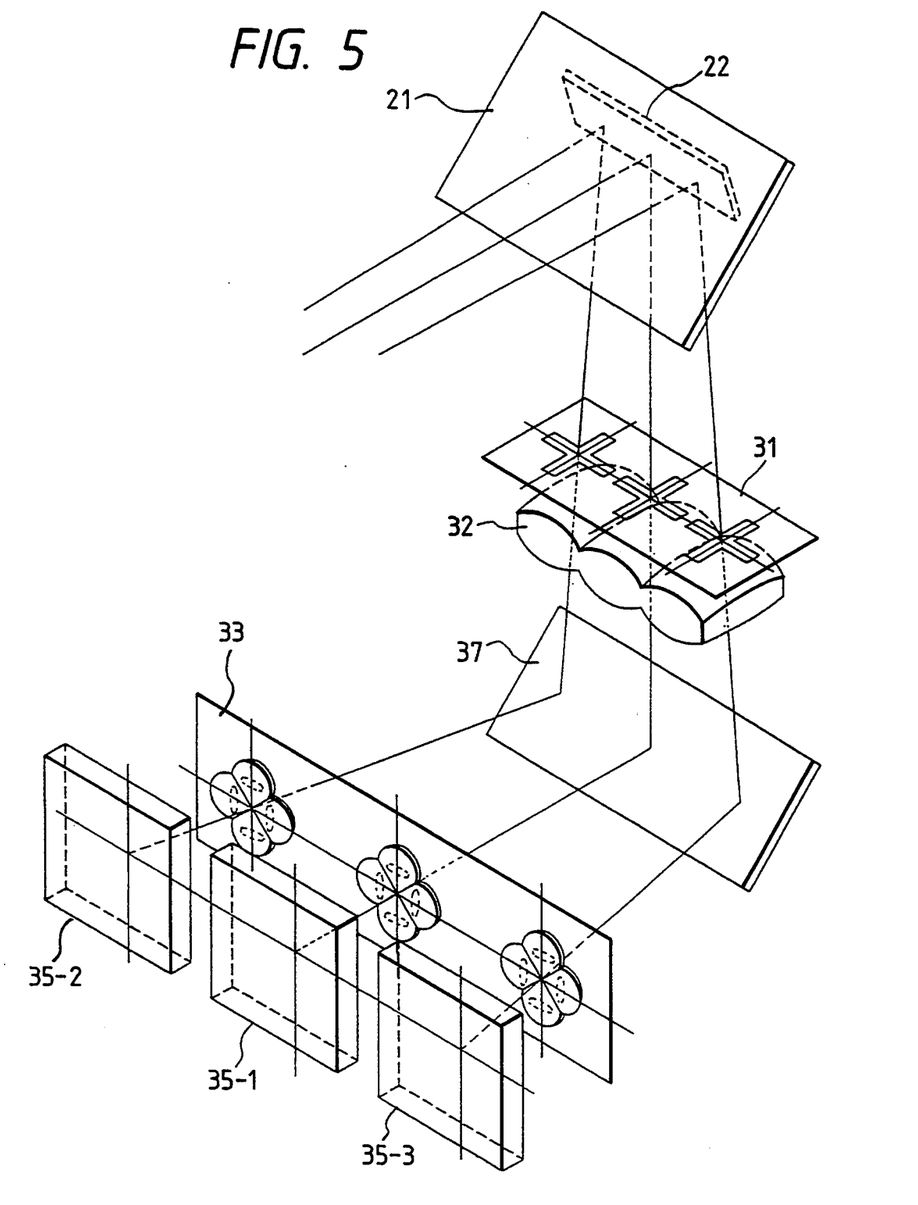
FIG. 5 is a schematic perspective view of still another embodiment of the focus state detecting device of the present invention, applied to a single-lens reflex camera.

Also if spaces are available on both sides of the central photosensor 35-1, three photosensors 35-2, 35-1, 35-3 may be arranged linearly, without deflection of the lateral optical paths, as shown in FIG. 5. In order to arrange the packages of the photosensors as in the embodiments shown in FIGS. 2 to 5, the selection of the arrangement of the lateral optical paths is important.

Figure 7A:
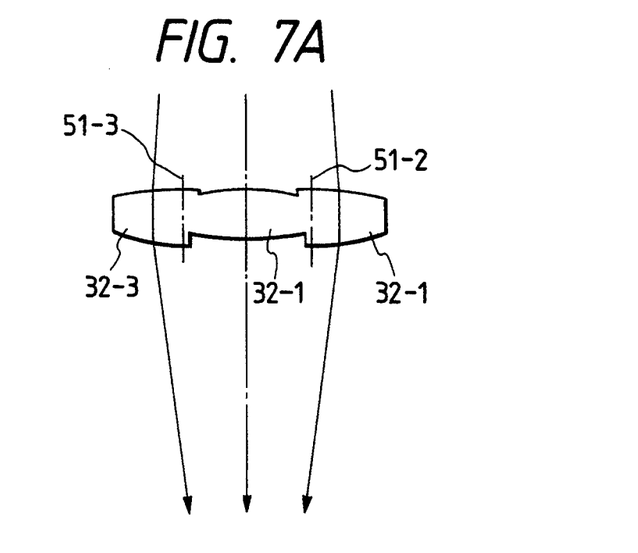
FIGS. 7A, 7B and 7C are schematic cross-sectional views showing the structure and function of the field lens.

In the focus state detecting device employing the photosensors constructed as a single unit, as shown in FIG. 8, the optical axes 51-2, 51-3 of the lenses for the lateral distance measuring areas are shifted from the centers of said lenses in the cross-sectional shape of the field lens 32, as shown in FIG. 7A, in order to minimize the photosensors. In such configuration, the light beams of the lateral distance measuring areas are deflected toward the central light beam, by passing through the peripheral areas of the lenses 32-2, 32-3, whereby the photosensor 35 can be reduced in dimension.

Figure 2:
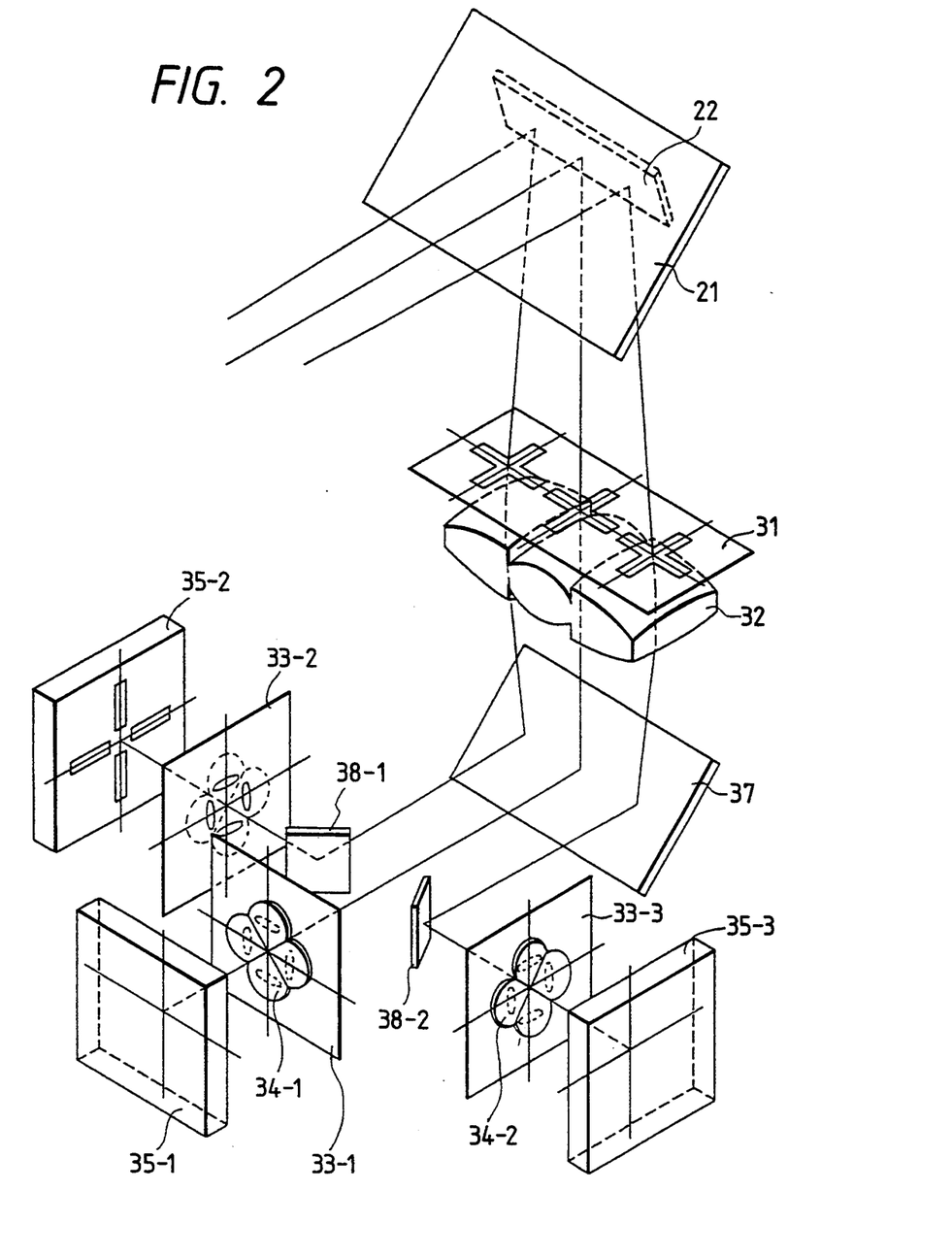
FIG. 2 is a schematic perspective view of another embodiment of the focus state detecting device of the present invention, applied to a single-lens reflex camera.
Figure 3:
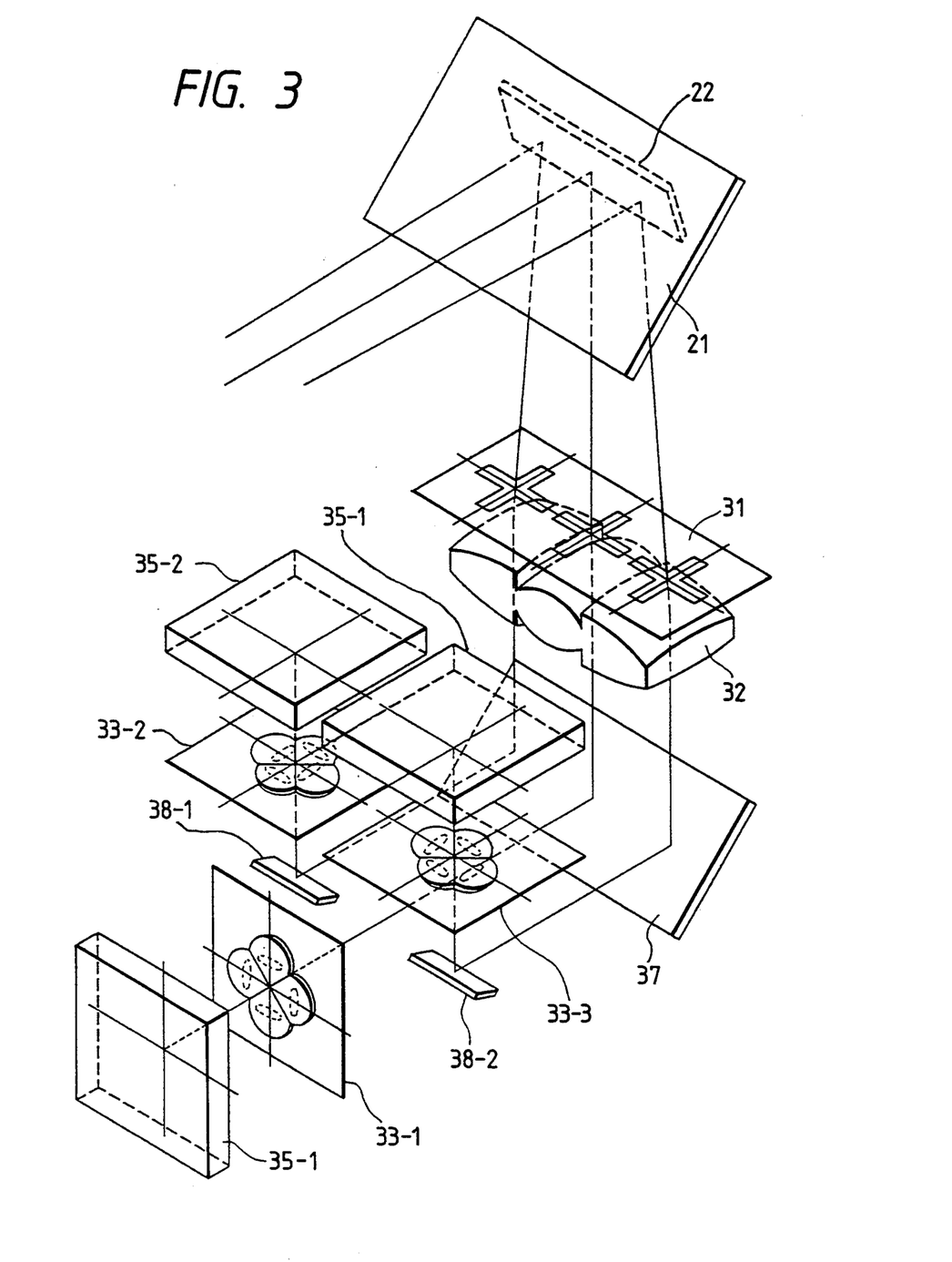
FIG. 3 is a schematic perspective view of still another embodiment of the focus state detecting device of the present invention, applied to a single-lens reflex camera.
Figure 4:
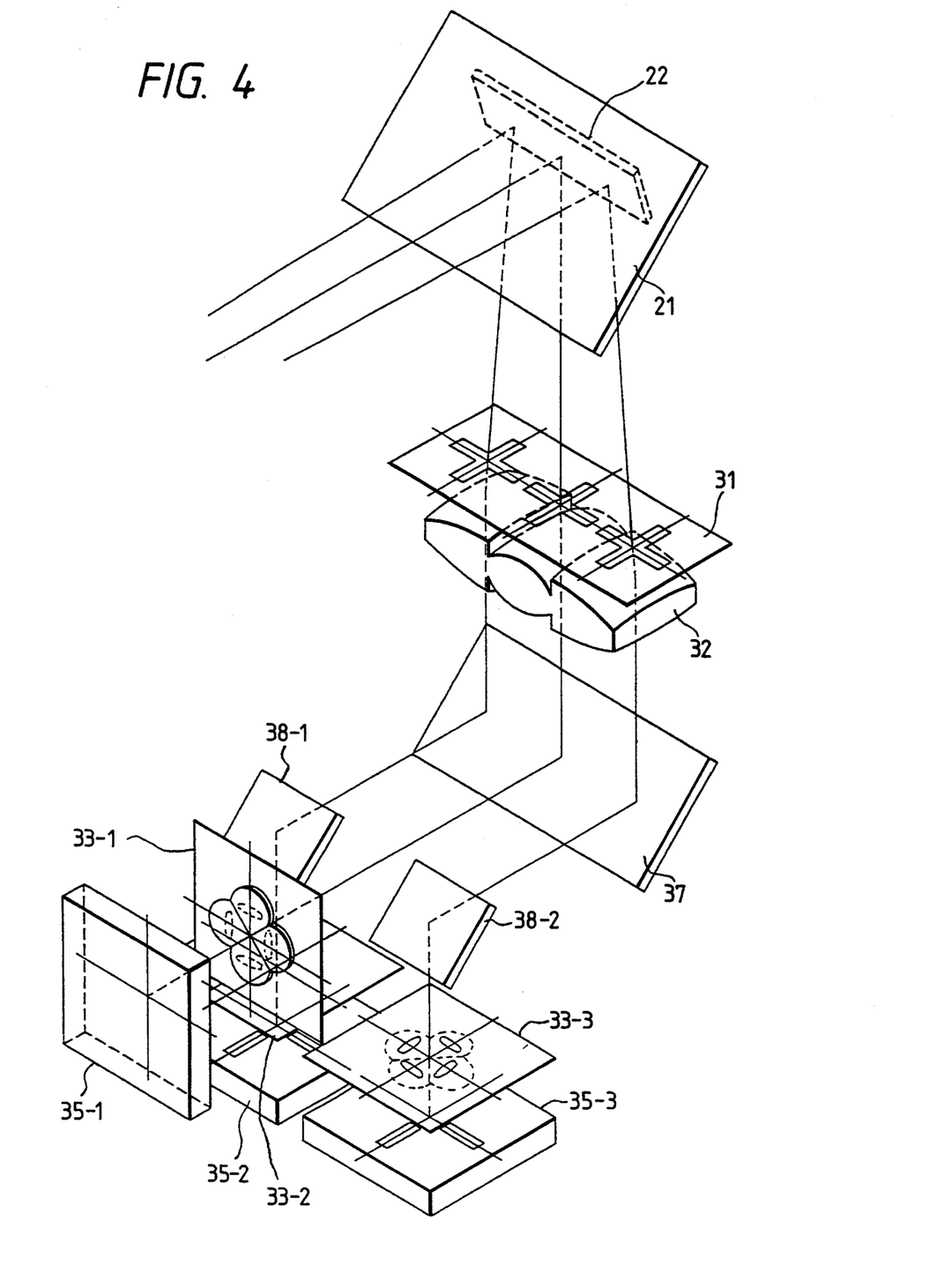
FIG. 4 is a schematic perspective view of still another embodiment of the focus state detecting device of the present invention, applied to a single-lens reflex camera.

The field lens of such configuration is effective for reducing the width of the focus state detecting device also in case the lateral optical paths are deflected laterally as shown in FIG. 2.

Figure 7B:
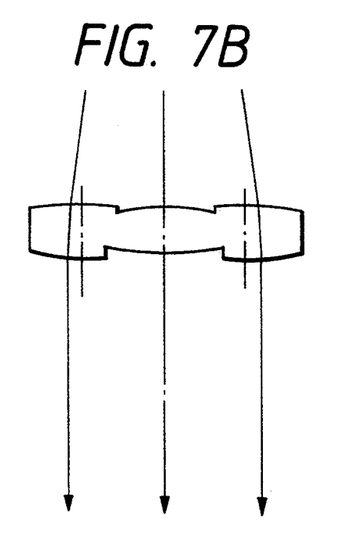

On the other hand, in case of the arrangements of the photosensors shown in FIGS. 3 to 6, there should be secured a certain distance between the optical paths at the position of the photosensors. It is therefore preferable, as shown in FIG. 7B, to bring the lateral optical paths closer to the optical axes of the lenses 32-2, 32-3 thereby reducing the deflection of optical paths toward the central optical path, and to arrange the three optical paths in substantially parallel manner behind the field lens.

Figure 7C:
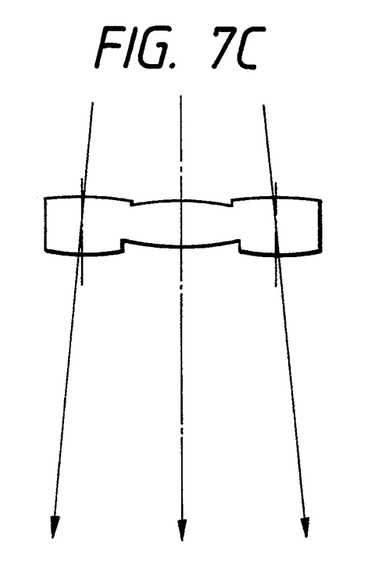

It is also possible, as shown in FIG. 7C, to arrange the light beams to pass through the vicinities of the optical axes of the component lenses 32-1, 32-2, 32-3 of the field lens 32, thereby totally eliminating the deflection of the lateral optical paths and thus securing the space for the photosensors.

According to the present invention explained in the foregoing, .in the focus state detecting device of divided-pupil phase difference system, capable of distance measurement in plural areas, the photosensors are constructed as separate units respectively corresponding to the distance measuring areas, so that the adjustment for aligning the sensor arrays of the photosensor with the image of the field mask formed by the re-imaging lens can be independently executed for each distance measuring area. Consequently optimum and precise adjustment can be achieved for each distance measuring area, even when said area requires rigorous positional adjustment, as in the case of cross shaped distance measuring area. It is therefore rendered possible to significantly improve the accuracy of focus state detection, in all the distance measuring areas of the focus state detecting device having plural distance measuring areas.

What is claimed is:

1. A focus state detecting device provided with:
   plural re-imaging means positioned at the image plane side of an objective lens and adapted to form different images of an object, respectively utilizing lights reaching different areas in the image field; and
   plural photosensor means for respectively receiving plural lights coming from the object and transmitted by said plural re-imaging means; and
   adapted to detect the focus state of said objective lens based on signals from said photosensor means, comprising:
   plural condenser lens means positioned respectively corresponding to said different areas in the image field;
   wherein said plural condenser lens means are integrally constructed as a single unit;
   said plural re-imaging means are integrally constructed as a single unit; and
   among said plural photosensor means, at least one is constructed as an independent unit separate from other photosensor means.

2. A focus state detecting device according to claim 1, wherein:
   at least one of said plural re-imaging means includes two pairs of re-imaging lenses; and
   photosensor means corresponding to said re-imaging means including said two pairs of re-imaging lenses include two pairs of photosensor units.

3. A focus state detecting device according to claim 2, wherein said two pairs of photosensor units are arranged along mutually different directions.

4. A focus state detecting device according to claim 1, further comprising:
   optical path deflecting means provided between said condenser lens means and said re-imaging means, and adapted to deflect the optical path after emerging from said condenser lens means and before reaching said photosensor means.

5. A focus state detecting device according to claim 4, wherein said optical path deflecting means is composed of a mirror.

6. A focus state detecting device provided with:
   plural re-imaging means positioned at the image plane side of an objective lens and adapted to form different images of an object, respectively utilizing lights reaching different areas in the image field; and plural photosensor means for respectively receiving plural lights coming from the object and transmitted by said plural re-imaging means; and adapted to detect the focus state of said objective lens based on signals from said photosensor means, comprising:

plural condenser lens means positioned respectively corresponding to said different areas in the image field;

wherein said plural condenser lens means are integrally constructed as a single unit;

among said plural re-imaging means, at least one is constructed independently from other re-imaging means; and among said plural photosensor means, at least one is constructed as an independent unit separate from other photosensor means.

7. A focus state detecting device according to claim 6, further comprising:

optical path deflecting means positioned between said condenser lens means and said re-imaging means constructed independently from other re-imaging means, and adapted for deflecting the optical path, from said condenser lens means to said photosensor means constructed as an independent unit separate from other photosensor means, to a direction different from the optical paths from said condenser lens means to other photosensor means.

8. A focus state detecting device according to claim 7, wherein said optical path deflecting means is adapted to deflect said optical path in a direction substantially parallel to a plane perpendicular to the optical axis of said objective lens.

9. A focus state detecting device according to claim 7, wherein said optical path deflecting means is absent between said condenser lens means and said other photosensor means.

10. A focus state detecting device according to claim 7, wherein:

at least one of said plural re-imaging means includes at least two pairs of re-imaging lenses; and the photosensor means corresponding to said re-imaging means including said two pairs or more of re-imaging lenses is provided with photosensor units of a number same as that of said re-imaging lenses.

11. A focus state detecting device provided with:

plural re-imaging means positioned at the image plane side of an objective lens and adapted to form different images of an object, respectively utilizing lights reaching different areas in the image field; and plural photosensor means for respectively receiving plural lights coming from the object and transmitted by said plural re-imaging means; and adapted to detect the focus state of said objective lens based on signals from said photosensor means, comprising:

plural condenser lens means positioned respectively corresponding to said different areas in the image field;

wherein, among said plural photosensor means, at least one is constructed as an independent unit separate from other photosensor means;

the photosensor means constructed as said independent unit includes two pairs of photosensor units; and said re-imaging means corresponding to said photosensor means constructed as said independent unit includes two pairs of re-imaging lenses.

12. A focus state detecting device according to claim 11, wherein said two pairs of photosensor units are arranged along mutually different directions.

13. A focus state detecting device according to claim 11, further comprising:

optical path deflecting means provided between said condenser lens means and said photosensor means constructed as an independent unit separate from other photosensor means, and adapted to deflect the optical path, from said condenser lens means to said photosensor means, to a direction different from the optical paths from said condenser lens means to said other photosensor means.

14. A focus state detecting device provided with:

plural re-imaging means positioned at the image plane side of an objective lens for forming images of different areas, respectively, of an image field of the objective lens, respectively utilizing lights reaching said different areas of the image field; and plural photosensor means respectively receiving plural lights coming from an object and transmitted by said plural re-imaging means for performing focus detection at said different areas of the image field and detecting the focus state of said objective lens based on signals from said photosensor means, comprising:

plural condenser lens means positioned respectively corresponding to said different areas of the image field;

wherein, among said plural photosensor means, at least one is constructed as an independent unit separate from other photosensor means, and at least one of photosensor means in said independent unit is so supported as not to be parallel to other photosensor means.

15. A focus state detecting device according to claim 14, wherein:

at least one of said plural re-imaging means includes two pairs of re-imaging lenses; and the photosensor means corresponding to the re-imaging means including said two pairs of re-imaging lenses includes two pairs of photosensor units.

16. A focus state detecting device according to claim 15, wherein said two pairs of photosensor units are arranged along mutually different directions.

17. A focus state detecting device according to claim 15, further comprising:

optical path deflecting means provided between said condenser lens means and said photosensor means supported in non-parallel manner to other photosensor means, and adapted to deflect the optical path, from said condenser lens means to said photosensor means supported in non-parallel manner, to a direction different from the optical paths from said condenser lens means to said other photosensor means.

18. A focus state detecting device provided with:

plural re-imaging means positioned at the image plane side of an objective lens for forming images of different areas, respectively, of an image field of the objective lens, respectively utilizing lights reaching said different areas of the image field; and plural photosensor means respectively receiving plural lights coming from an object and transmitted by said plural re-imaging means for performing focus detection at said different areas of the image field and detecting the focus state of said objective lens based on signals from said photosensor means, comprising:

condenser lens means positioned between said objective lens and said re-imaging means including plural condenser lenses corresponding to said different areas in the same optical path;

wherein at least one of said plural photosensor means is constructed as an independent unit separate from other photosensor means.

19. A focus state detecting device according to claim 18, wherein:

each of said plural photosensor means includes at least one pair of photosensor units.

20. A focus state detecting device according to claim 18, further comprising:

optical path deflecting means provided between said condenser lens means and said re-imaging means and adapted to deflect the optical path, after emerging from said condenser lens means and before reaching said photosensor means.

21. A focus state detecting device according to claim 20, wherein said optical path deflecting means is composed of a mirror.

22. A focus state detecting device according to claim 18, wherein said optical path deflecting means is absent in at least one of the plural optical paths from said condenser lens means to said photosensor means.

23. A focus state detecting device according to claim 20, wherein two or more optical path deflecting means are provided in at least one of said plural optical paths.

24. A focus state detecting device according to claim 23, wherein at least one of said optical path deflecting means is adapted to deflect plural optical paths in a same direction.

25. A focus state detecting device according to claim 23, wherein only one optical path deflecting means is provided in at least one of said plural optical paths.

26. A focus state detecting device according to claim 18, wherein, in said condenser lens means, the optical axes of the lenses corresponding to said different areas other than the central one are positioned in the vicinity of centers of the lenses corresponding to said different areas other than the central one.

27. A focus state detecting device according to claim 18, further comprising:

condenser lens means positioned between said objective lens and said re-imaging means and integrally including plural lenses corresponding to said different areas;

wherein, in said condenser lens means, the light beams transmitted by the lenses corresponding to said different areas other than the central one are deflected by said lenses in such a manner as to become farther from the optical path transmitted by the lens corresponding to said central area.

28. A focus state detecting device provided with:

plural re-imaging lenses adapted to form images of different areas of an image field, respectively utilizing lights reaching said different areas of the image field; and plural light-receiving parts respectively receiving plural lights coming from an object and transmitted by said plural re-imaging lenses to detect the focus state of an objective lens based on signals from said light-receiving parts, comprising:

plural condenser lenses positioned respectively corresponding to said different areas of the image field;

wherein said plural condenser lenses are integrally constructed as a single unit;

said plural re-imaging lenses are integrally constructed as a single unit; and at least one of said plural light-receiving parts is constructed as an independent unit separate from other light-receiving parts.

29. A focus state detecting device provided with:

plural re-imaging lenses adapted to form images of different areas of an image field, respectively utilizing lights reaching said different areas of the image field; and plural light-receiving parts respectively receiving plural lights coming from an object and transmitted by said plural re-imaging lenses to detect the focus state of an objective lens based on signals from said light-receiving parts, comprising:

plural condenser lenses positioned respectively corresponding to said different areas of the image field;

wherein said plural condenser lenses are integrally constructed as a single unit;

at least one of said plural re-imaging lenses is constructed independently from other re-imaging lenses; and at least one of said plural light-receiving parts is constructed as an independent unit separate from other light-receiving parts.

30. A focus state detecting device provided with:

plural re-imaging lenses adapted to form images of different areas of an image field, respectively utilizing lights reaching said different areas of the image field; and plural light-receiving parts respectively receiving plural lights coming from an object and transmitted by said plural re-imaging lenses to detect the focus state of an objective lens based on signals from said light-receiving parts, comprising:

plural condenser lenses positioned respectively corresponding to said different areas of the image field;

wherein, at least one of said plural light-receiving parts is constructed as an independent unit separate from other light-receiving parts;

said at least one light-receiving part constructed as said independent unit includes two pairs of light-receiving elements; and said re-imaging lenses transmitting lights coming from one condenser lens of said plural condenser lenses to said at least one light-receiving part constructed as said independent unit include two pairs of re-imaging lenses.

31. A focus state detecting device provided with:

plural re-imaging lenses adapted to form images of different areas of an image field, respectively utilizing lights reaching said different areas of the image field; and plural light-receiving parts respectively receiving plural lights coming from an object and transmitted by said plural re-imaging lenses and performing focus detection at said different areas of the image field to detect the focus state of an objective lens based on signals of said light-receiving parts, comprising:

plural condenser lenses positioned respectively corresponding to said different areas of the image field;

wherein at least one of said plurality of light-receiving parts is constructed as an independent unit separate from other light-receiving parts, and at least one of said light-receiving parts in said independent unit is so supported as not to be parallel to other light-receiving parts.

32. A focus state detecting device provided with:

plural re-imaging lenses adapted to form images of different areas of an image field, respectively utilizing lights reaching said different areas of the image field; and plural light-receiving parts respectively receiving plural lights coming from an object and transmitted by said plural re-imaging lenses and determining the focus state of said images to detect the focus state of an objective lens based on signals of said light-receiving parts, comprising:

plural condenser lenses positioned respectively corresponding to said different areas of the image field in the same optical path;

wherein at least one of said plural light-receiving parts is constructed as an independent unit separate from other light-receiving parts.

33. A focus state detecting device according to claim 18, wherein said plural condenser lenses corresponding to said different areas are integrally constructed as a single unit.

* * * * *